(12) United States Patent
Walcome (10) Patent No.: US 6,394,132 B1
(45) Date of Patent: May 28, 2002

(54) DECK WASH VALVE

(76) Inventor: Richard O. Walcome, 240 Airport Rd., Port Townsend, WA (US) 98368

( * ) Notice: Subject to any disclaimer, the term of this patent is extended or adjusted under 35 U.S.C. 154(b) by 0 days.

(21) Appl. No.: 09/788,008

(22) Filed: Feb. 15, 2001

Related U.S. Application Data

(63) Continuation-in-part of application No. 09/715,925, filed on Nov. 17, 2000.
(60) Provisional application No. 60/167,530, filed on Nov. 24, 1999.

(51) Int. Cl.[7] ............................................... F16L 37/30
(52) U.S. Cl. ................................. 137/614.2; 251/149.6
(58) Field of Search ........................ 137/614.2, 614.05, 137/614.04; 251/149.6

(56) References Cited

U.S. PATENT DOCUMENTS

| | | |
|---|---|---|
| 4,509,554 A | 4/1985 | Failla |
| 5,064,227 A | 11/1991 | Spors et al. |
| 5,318,332 A | 6/1994 | Hohmann et al. |
| 5,624,073 A * | 4/1997 | Mueller et al. ...... 251/149.6 X |
| 5,673,945 A | 10/1997 | Olson |
| 5,681,061 A | 10/1997 | Olson |
| 5,730,475 A | 3/1998 | Kargula |
| 5,788,290 A | 8/1998 | Meisinger |
| 5,887,911 A | 3/1999 | Kargula |
| 5,918,913 A | 7/1999 | Lewis et al. |

OTHER PUBLICATIONS

U.S. Utility Patent Application: Serial No. 09/715,925 filed on Nov. 17, 2000 entitled Deck Wash Valve Applicant: Mr. Richard O. Walcome.

* cited by examiner

Primary Examiner—Kevin Lee
(74) Attorney, Agent, or Firm—David L Garrison; William L. Haynes; Garrison & Assoc. PS (57) ABSTRACT

A flush mounted valve assembly for releasably coupling a tubular member to the valve assembly by simple, one-handed operation. The tubular member, one end of which may be connected to a hose, is inserted into the coupler to open the valve. Helical grooves with a detent section on the tubular member engage matching nibs on the coupler, allowing the tubular member to be locked into place on insertion and rotation. Insertion of the tubular member opens a valve between the valve housing and the coupler member, permitting water from the pressurized water source to flow through the tubular member. O-rings are provided on the tubular member that engage the coupler prior to the opening of the valve, thereby preventing leakage around the tubular member. The valve housing and coupling are removably connected to each other, allowing easy access to the valve for periodic maintenance and alignment with the water source.

27 Claims, 5 Drawing Sheets

DECK WASH VALVE

CROSS REFERENCE TO RELATED APPLICATION

This application is a continuation-in-part of and claims priority based on Application Ser. No. 09/715,925, filed Nov. 17, 2000. This application further claims the benefit of United States Provisional Application Serial No. 60/167,530, entitled Deck Wash Valve filed Nov. 24, 1999.

FIELD OF INVENTION

The present invention relates to hydraulic valves, and in particular to a flush-mountable quick release valve with a locking hose adaptor.

BACKGROUND OF THE INVENTION

Fresh water valves and faucets, are ubiquitous in homes, buildings, recreational vehicles and other structures. Faucets generally incorporate valves that are operated by turning a handle, that opens a flow path between a pressurized water source and a faucet spout and/or hose. Such valves are a very convenient means for providing a controllable flow of fresh water for various applications.

For certain applications, however, conventional fresh water faucets are too bulky and obtrusive. Conventional faucets protruding from flat surfaces, for example, can constitute a hazardous obstacle to passersby, that may be bumped into, or tripped over. In addition to the potential for injury to passersby, such faucets may sustain damage themselves from inadvertent collisions with persons or objects, potentially resulting in water spills ranging from the inconvenient to the catastrophic.

Moreover, conventional, protruding faucets can be aesthetically undesirable in appearance.

For example, it is desirable to have a source of fresh water available for cleaning or rinsing off the decks of sailboats and yachts, as well as other equipment that may be stored on the deck such as floatation devices, winches, attachment hardware, hatches, and furniture. The ability to rinse such decks and equipment is particularly important for vessels operating in salt water, which is extremely corrosive. Regular cleaning of equipment subject to a saltwater environment can greatly increase the life of such equipment. The use of conventional faucets for such an application, however, would not be desirable, as such protruding faucets would present an unsightly and hazardous obstacle on most vessels.

One option is to install faucets in compartments requiring the user to open a door to access the faucet. While this method could eliminate the aesthetically undesirable aspects of such faucets, it is expensive and requires a significant amount of space, which space is generally at a premium in marine vessels. Moreover, the access doors are an additional item that must be maintained by the boat owner, and can themselves present an obstacle if they are left in the open position.

SUMMARY OF THE INVENTION

Accordingly, it is an object of the present invention to provide an inexpensive, flush-mounted water valve assembly comprising a generally cylindrical valve housing removably connectable to an external water source, a cylindrical coupler member having a longitudinal channel therethrough, removably connectable to the valve housing and having a flanged upper end, a spring retainably insertable into the valve housing and a valve in the valve housing that is releasably biased toward the coupler by the spring such that the valve blocks said coupler channel. A tube is removably inserted into the coupler such that it pushes the valve into an open position.

It is a further object of the present invention to provide helical grooves on the tube that engage nibs in the coupler such that the tube may be inserted into the coupler with a simple twist of the tube.

It is an additional object of the present invention to provide a valve assembly that can be installed without requiring tape, pipe compound, or other sealant materials to prevent components of the assembly from leaking.

These and such other objects of the invention as will become evident from the disclosure below are met by the invention disclosed herein. In addition to the explicitly claimed method and apparatus described herein, as such, it is to be understood that all new and useful devices or components described herein are considered to constitute a part of the invention, claimable in their own right, whether such is stated with particularity herein or not.

BEST MODE OF CARRYING OUT THE INVENTION

Turning now to the drawings, the invention will be described in a preferred embodiment by reference to the numerals of the drawing figures wherein like numbers indicate like parts.

Figure 1:
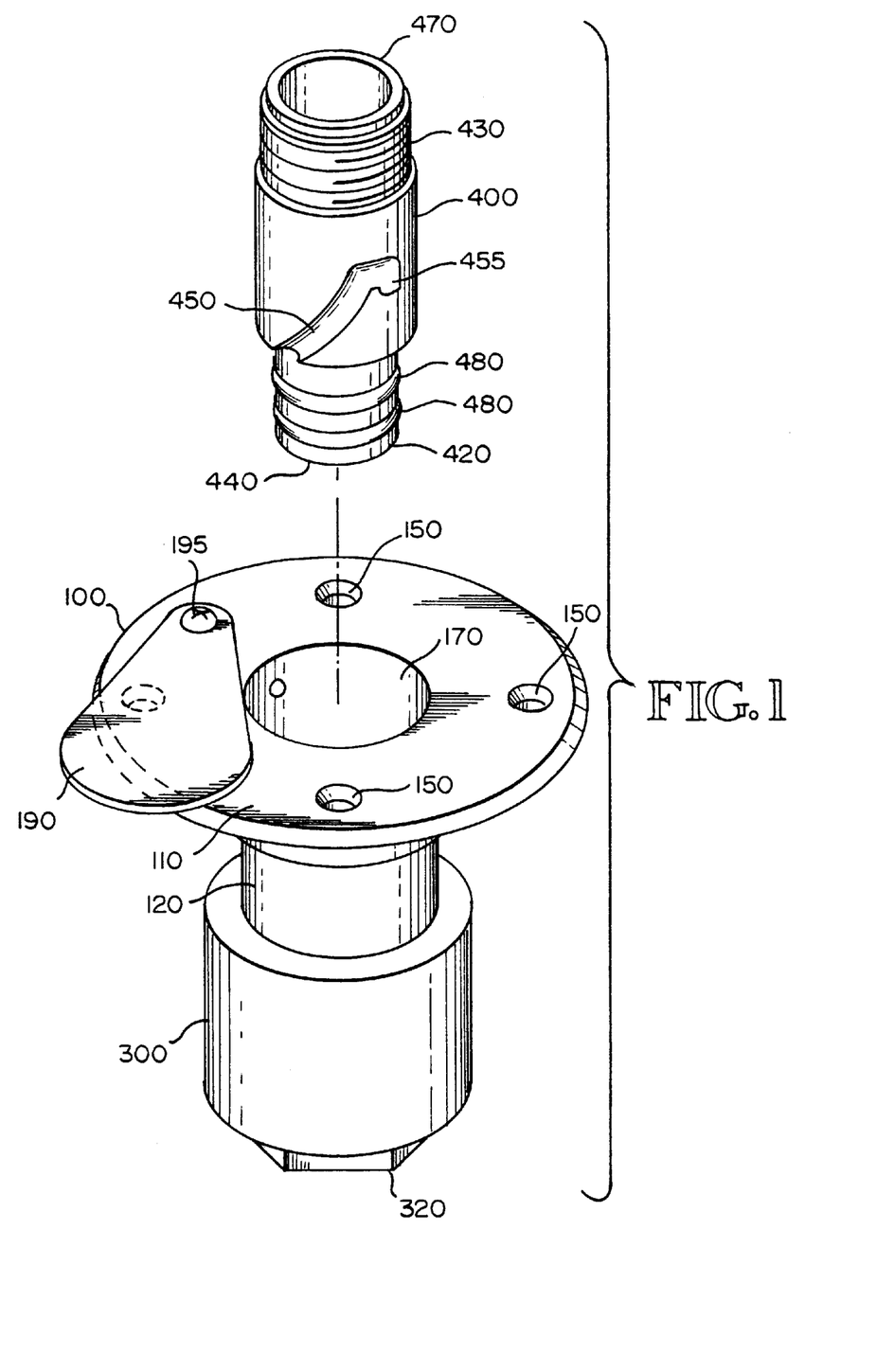
FIG. 1 is a perspective view of the assembled valve assembly of the present invention in its preferred embodiment.

As can best be seen in FIG. 1, the preferred embodiment comprises a valve housing 300 removably connected to a coupler member 100. The coupler 100 has a cylindrical channel 170 longitudinally therethrough and a flange portion 110 that has a plurality of countersunk holes 150 to allow the coupler 100 to be mounted on a flat surface. To open the valve, a tube member 400 is inserted into the coupler 100, thereby allowing water to flow from a water source connected to the valve housing 300, and through the tube member 400, as discussed in detail below.

The valve housing 300 of the preferred embodiment is a generally cylindrical compartment having a longitudinal channel therethrough 370. As can best be seen in FIGS. 3 and 4, the upper portion of the valve housing 300 is threaded on its interior surface 340 for attachment to the coupler 100, and the lower portion of the valve housing 300 is threaded on its interior surface 360, to allow the valve assembly to be connected to an external water source (not shown). In the preferred embodiment the lower portion 320 of the valve housing 300 has an hexagonal exterior, to facilitate installation to the external water source.

Figures 3, 4:
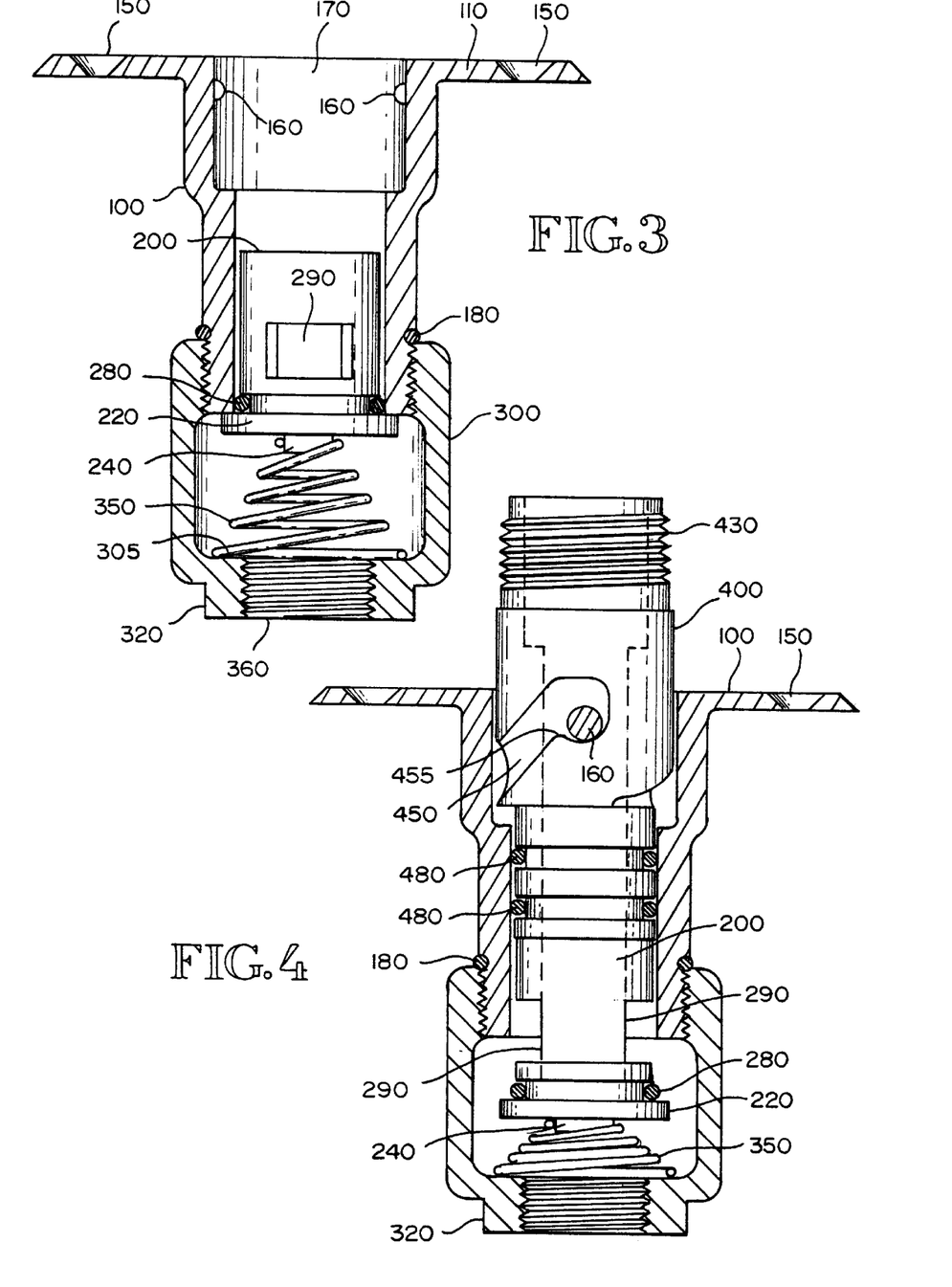
FIG. 3 is a sectional view of the preferred embodiment shown in FIG. 1 showing the valve position when the tube member is not inserted into the coupler.
FIG. 4 is a sectional view of the preferred embodiment shown in FIG. 3, rotated ninety degrees and showing the valve position when the tube member is inserted into the coupler.

The lower portion 320 is also smaller in diameter than the upper portion of the valve housing 300, thereby creating an internal lip 305 in the interior of the valve housing 300. A spring 350 with a maximum diameter large enough to be retained by the lip 305, and preferably conical in overall shape, is inserted into the valve housing 300, as shown in FIG. 3, with the smaller diameter portion of the spring extending upwardly.

The coupler 100 has a cylindrical lower portion 120 having external threads 130 that engage the valve housing threads 340, allowing these parts to be removably connected together. A coupler body groove 185 is provided at the upper end of the threaded portion of the coupler 130, to accommodate coupler body O-ring 180, whereby a water-tight connection is formed when the valve housing 300 and the coupler 100 are securely connected.

Figure 2:
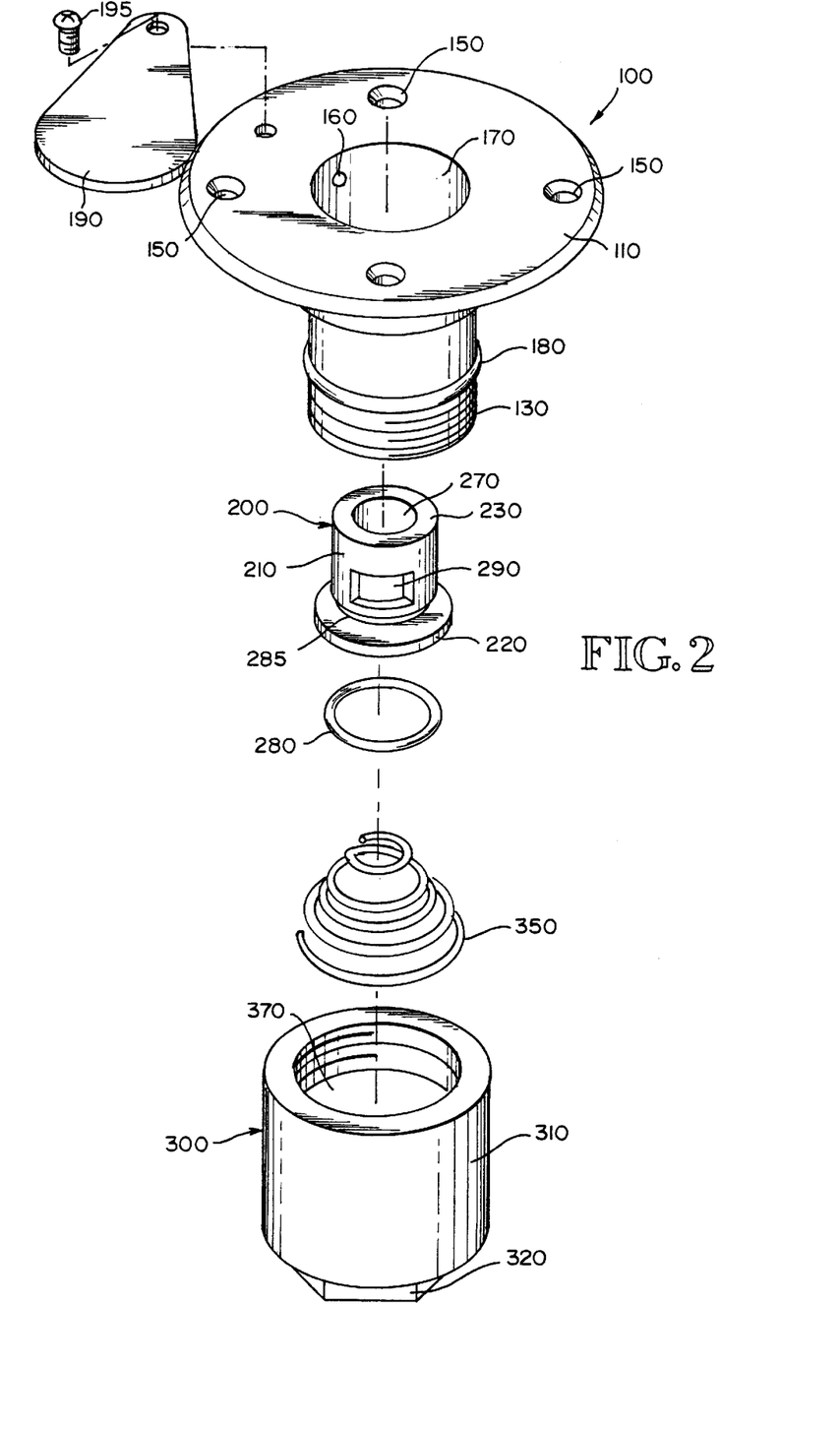
FIG. 2 is an exploded view of the valve housing and coupler member of the preferred embodiment shown in FIG. 1.

As can best be seen in FIG. 2, the valve 200 of the preferred embodiment has a cylindrical portion 210 with a longitudinal channel therethrough 270. A disc-shaped valve plate 220, slightly larger in diameter than the cylindrical portion 210 of the valve 200, is attached to the lower portion of the valve 200. A pair of large, preferably rectangular, transverse holes 290 are provided in the walls of the cylindrical portion 210, above the valve plate 220. A groove 285, accommodating an O-ring 280, is provided on the cylindrical portion of the valve 210, above the valve plate 220. The diameter of the cylindrical portion of the valve 210 is slightly smaller than the diameter of the coupler channel 170, and the diameter of the valve plate 220 is slightly larger than the diameter of the coupler channel 170, but smaller than the diameter of the valve housing channel 370. Therefore, when the valve 200 is inserted into the valve housing 300 above the spring 350, as shown in FIG. 3, and the coupler 100 is screwably attached to the valve housing 300, the cylindrical valve portion 210 extends into the coupler channel 170. The spring 350 biases the valve 200 toward the coupler channel 170, and the valve plate 220 and O-ring 280 provide a sealed closure between the valve housing channel 370 and the coupler channel 170. In the preferred embodiment the valve plate 220 includes a smaller disc-shaped spring indexing guide 240 on its lower surface that engages the top of the spring 350.

The tube member 400 includes a threaded portion 430 at its upper end for connecting the tube member 400 to a hose or other water conveyancer (not shown). A pair of helical grooves 450 are provided on the outer surface of the midsection 410 of the tube member 400, each extending approximately half way around the circumference of the tube member 400. The helical grooves 450 are sized to engage a pair of oppositely disposed nibs 160 on the interior surface of the cylindrical channel 170 of the coupler 100. When the tube member 100 is partially inserted into the coupler channel 170 engaging the helical grooves 450 with the nibs 160, a clockwise twisting of the tube member 400 of approximately ninety degrees will cause the tube member 400 to be pulled into the coupler channel 170. This allows easy, one-handed operation of the valve. As shown in FIG. 1, the helical grooves 450 terminate in a horizontal and then reverse detent portion 455 thereby retaining the tube member into the coupler channel 170.

The tube member lower portion 420 include two circumferential grooves 485 that each accommodate an O-ring 480 thereby sealing the interface between the coupler channel 170 and the tube member 400 when the tube member 400 is inserted, thereby preventing the leakage of water between the tube member 400 and the coupler channel 170. The unique double-O-ring configuration provides a water-tight seal even when the valve assembly is mounted on a horizontal surface. If only a single O-ring 480 were provided then the weight of the hose attached to the tube member 400 would result in a lateral displacement of the tube member 400, and potentially allow water to leak past the single O-ring.

As shown in FIG. 4, the diameter of the tube member 400 at its lower surface is approximately equal to the diameter of the cylindrical portion of the valve 210, and the length of the tube member 400 is selected such that the bottom surface 440 of the tube member 400 abuts the upper surface of the valve 230 when the tube member 400 is partially inserted into the coupler channel 170. Further insertion of the tube member 400, therefore, pushes the valve 200 against the biasing force of the spring 350, (and against the water the water pressure that may be present in the valve housing 300) allowing the valve 200 to slide further into the valve housing 300. When the valve housing is connected to an external, pressurized water source, therefore, a flow path from the valve housing 300, through the transverse holes in the valve 290, and through the tube member 400.

By depressing the tube member 400, to release the engagement of the nibs 160 with the detent portion of the helical grooves 455, and twisting the tube member 400 counterclockwise, the tube member 400 is released from the coupler 100. The biasing force from the spring 350 on the valve 200, and the water pressure in the valve housing 300, force the cylindrical portion of the valve 210 back into the coupler channel 170 and the valve plate 220 and O-ring 280 back toward the coupler 100 to close the valve.

The valve housing 300 and coupler 100 are made from stainless steel in the preferred embodiment, in order to withstand the corrosive salt-water environment for marine applications, and to provide sufficient strength to withstand the rigors associated with installation on a boat deck. It will be obvious to one of ordinary skill in the art, however, that other applications are also possible, for example in homes and buildings, where exposure and corrosion are not major concerns. Also, installation may be on a horizontal surface, or wall, where the coupler is less exposed to inadvertent damage. For such lighter-duty applications other materials would obviously be appropriate.

It is also noteworthy that the valve 200 may be located significantly below the mounting surface defined by the coupler flange 110. In applications where freezing is a consideration, this design will reduce or eliminate the threat of freezing pipes, by allowing the water cutoff to be closer to the warm interior of the vessel or building to which the valve assembly is installed. This design also reduces the threat of damage due to accidental bumping or deliberate vandalism. Virtually none of the valve assembly, except the coupler flange 110, is above surface level. If a vandal attempts to insert foreign objects into the valve assembly, sufficient force would merely open the valve and presumably douse the vandal.

In the preferred embodiment a small flat cover plate 190 is pivotally attached to the flange portion 110 with a single screw 195, thereby allowing the cover plate 190 to cover the cylindrical channel 170 when the valve assembly is not in use, and to pivot out of the way when the valve assembly is in use.

Figure 5:
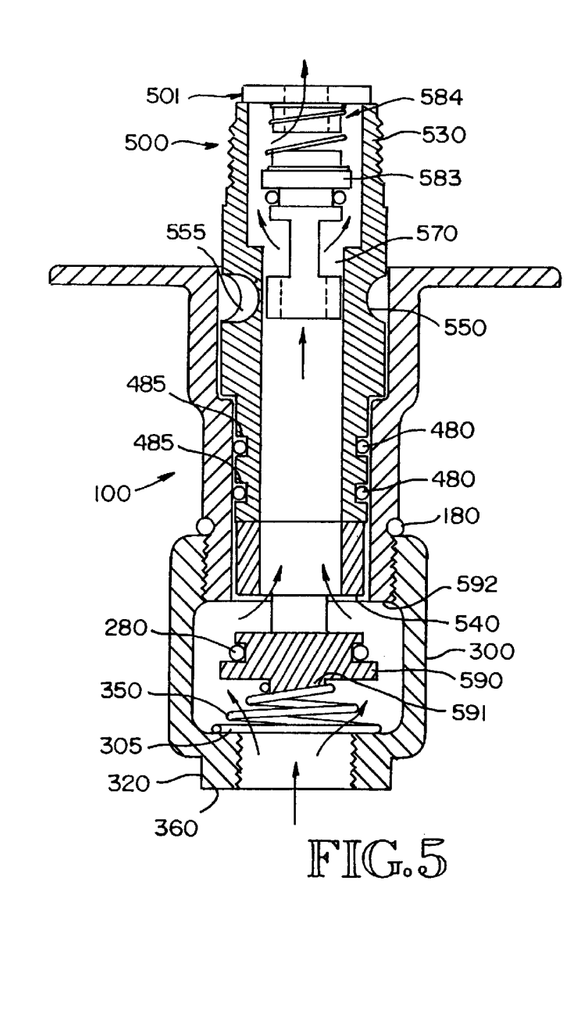
FIG. 5 is a cross sectional view of a second embodiment of this invention in which a check valve is incorporated into the tube member.
Figure 6:
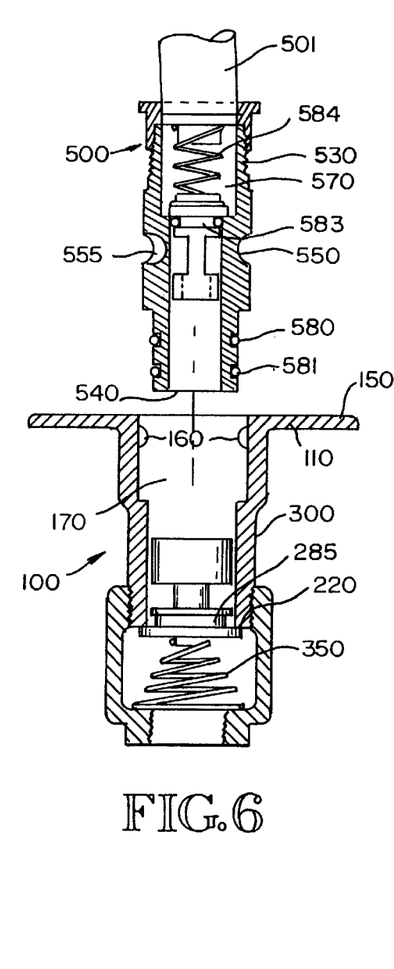
FIG. 6 is an exploded view of the device shown in FIG. 5 in which the tube member is disconnected from the coupler member.
Figure 7:
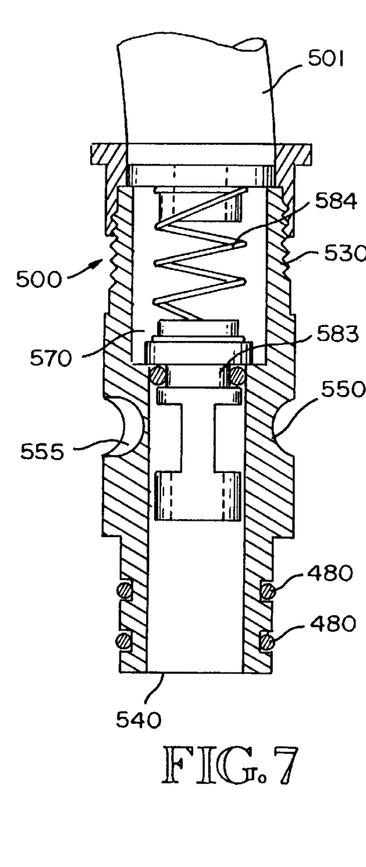
FIG. 7 is an enlarged cross sectional view of the tube member shown in FIG. 6.

A second embodiment of the invention is shown in FIGS. 5–7 in which a check valve, shown generally at 502, is incorporated into the tube member 500. Check valve 502 is comprised of check valve body 583, O-rings 480 and valve spring 584. In FIG. 5, the check valve is shown as being open with the arrows indicating direction of flow of water or other fluids therethrough. When tube body 500 is disengaged from coupler 100, as shown in FIG. 6, spring 584 causes valve body 583 to close and seal, thereby precluding back flow of water through the check valve. As tube body 500 is removed from coupler member 100, check valve 200 closes under the biasing influence of spring 350. As a result, the water flow is stopped in both directions when the tube 500 is removed from coupler 100.

Figure 8:
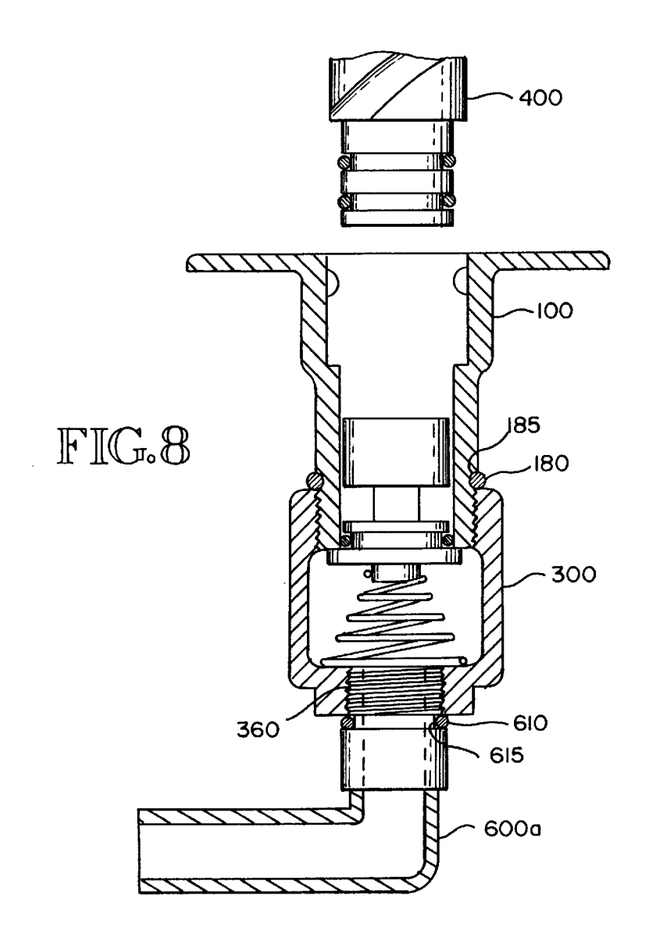
FIG. 8 is a cross sectional view showing an alternative embodiment of this invention in which an elbow connector is joined to the valve housing.
Figure 9:
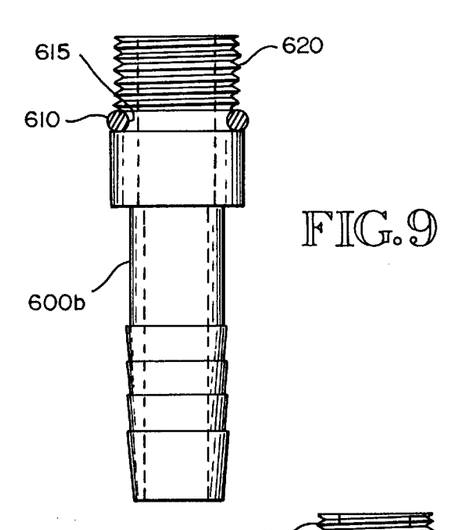
FIG. 9 is a side view of an alternative embodiment with a straight hose connector.
Figure 10:
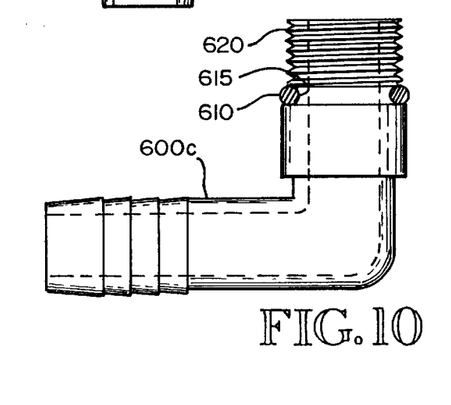
FIG. 10 is side view of an alternative embodiment with an elbow hose connector.

A third preferred embodiment is depicted in FIGS. 8-10 in which supply connector 600a–c is joined by connector threaded portion 620 and valve housing lower threaded portion 360 to the valve housing 300. Said connection is sealed with connector O-ring 610 mounted in O-ring groove 615. The valve housing 300 is joined to the coupler member 100 by threads 130 and 340. The valve housing 300 to coupler member 100 joint is sealed with coupler O-ring 180 mounted in coupler O-ring groove 185. By using the O-ring seals, a seal can be achieved between the components of the valve assembly without requiring tape, pipe compound, or other sealant materials to prevent components of the assembly from leaking. As a further result of using the O-rings, the valve-connector assembly can be rotated to align an elbow connector 600a or 600c with the water supply without breaking the seals formed by the O-rings.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A valve assembly comprising:
    a. a valve housing comprising a generally cylindrical tube having a first and second end and a longitudinal valve housing channel therethrough, said first end removably connectable to an external water source;
    b. a coupler member comprising a generally cylindrical tube portion having a proximal end and a distal end and a longitudinal coupler member channel therethrough, wherein said proximal end is removably connectable to said second end of said valve housing whereby said valve housing channel is generally aligned with said coupler member channel and, said distal end further comprises a flange portion connected thereto;
    c. a spring retainably insertable into said valve housing channel;
    d. a valve insertable into said valve housing channel above said spring, said valve having a first portion that is transversely larger than said coupler member channel cross-section and a second portion that is insertable into said coupler member channel, whereby when said coupler member is connected to said valve housing, said valve housing is connected to said external water source, and said external water source is pressurized, said valve is releasably biased toward said coupler member channel by said spring and said first portion of said valve blocks said coupler member channel, so that no fluid may flow from said external water source through said valve housing channel;
    e. a tube member comprising a generally cylindrical tube portion having an insertion end and a non-insertion end and a longitudinal channel therethrough, wherein said insertion end is removably insertable into said coupler member channel from said coupler member distal end whereby said tube member contacts said second portion of said valve;
        thereby, when sufficient insertion force is applied to move said valve, said coupler member channel is unblocked, allowing fluid to flow freely from said external water source.

2. The valve assembly of claim 1 wherein said coupler member further comprises at least one nib protruding into said coupler member channel, and said tube member further comprises at least one groove on the outer surface of said tube member, said at least one groove starting at said insertion end of said tube member and following a generally helical path around the outer surface of said tube member, said at least one groove having a locking detent portion at the end of said groove opposite said insertion end of said tube member; whereby said at least one groove engages said at least one nib when said tube member is inserted into said coupler member channel and rotated said tube member is pulled into said coupler member until said locking detent portion locks said tube member in place, thereby, sufficient insertion force is applied to move said valve, and said coupler member channel is unblocked allowing fluid to flow freely from said external water source.

3. The valve assembly of claim 1 further comprising an O-ring installable on said valve near said first portion whereby said valve will sealably block said coupler member channel when said tube member is not inserted.

4. The valve assembly of claim 1 further comprising an O-ring installable on said tube member at an axial location whereby said O-ring sealably engages said coupler member channel before said tube member contacts said valve.

5. The valve assembly of claim 1 further comprising a cover plate pivotally attachable to said flange portion of said coupler member whereby said plate can be positioned to cover said coupler member channel when said tube member is not inserted, and positioned out of the way when said tube member is inserted into said coupler member channel.

6. The valve assembly of claim 1 wherein said first end of said valve housing further comprises an hexagonal portion.

7. The valve assembly of claim 1 wherein said tube member further includes a check valve adapted to prevent back flow of water from said tube member when removed from said coupler member.

8. The valve assembly of claim 7 wherein said check valve is opened by flow of fluid from said coupler member into said tube member.

9. A valve assembly comprising:
    a. a valve housing comprising a generally cylindrical tube having a first and second end and a longitudinal valve housing channel therethrough, said first end removably connectable to an external water source;

b. a coupler member comprising a generally cylindrical tube portion having a proximal end and a distal end and a longitudinal coupler member channel therethrough, and at least one nib protruding into said coupler member channel, wherein said proximal end is removably connectable to said second end of said valve housing whereby said valve housing channel is generally aligned with said coupler member channel and, said distal end further comprises a flange portion connected thereto;

c. a spring retainably insertable into said valve housing channel;

d. a valve insertable into said valve housing channel above said spring, said valve having a first portion that is transversely larger than said coupler member channel cross-section and a second portion that is insertable into said coupler member channel, whereby when said coupler member is connected to said valve housing, said valve housing is connected to said external water source, and said external water source is pressurized, said valve is releasably biased toward said coupler member channel by said spring and said first portion of said valve blocks said coupler member channel, so that no fluid may flow from said external water source through said valve housing channel;

e. a supply connector member comprising a generally cylindrical tube having a connection end and a threaded end, said connection end removably connectable to an external water source, and said threaded end removably connectable to said first end of said valve housing; and f. a tube member comprising a generally cylindrical tube portion having an insertion end and a non-insertion end and a longitudinal channel therethrough, wherein said insertion end is removably insertable into said coupler member channel at said coupler member distal end, said tube member further comprising at least one groove on the outer surface of said tube member, said at least one groove starting at said insertion end of said tube member and following a generally helical path around the outer surface of said tube member, said at least one groove having a locking detent portion at the end of said groove opposite said insertion end of said tube member;

whereby said tube member contacts said second portion of said valve and at least one groove engages said at least one nib when said tube member is inserted into said coupler member and rotated, said tube member is pulled into said coupler member until said locking detent portion locks said tube member in place, thereby, sufficient insertion force is applied to move said valve, and said coupler member channel is unblocked allowing fluid to flow freely from said external water source.

10. The valve assembly of claim 9 further comprising an O-ring installable on said valve near said first portion whereby said valve will sealably block said coupler member channel when said tube member is not inserted.

11. The valve assembly of claim 9 further comprising at least one O-ring installable on said tube member at an axial location whereby said O-ring sealably engages said coupler member channel before said tube member contacts said valve.

12. The valve assembly of claim 9 further comprising a cover plate pivotally attachable to said flange portion of said coupler member whereby said plate can be positioned to cover said coupler member channel when said tube member is not inserted, and positioned out of the way when said tube member is inserted into said coupler member channel.

13. The valve assembly of claim 9 wherein said first end of said valve housing further comprises an hexagonal portion.

14. The valve assembly of claim 9 wherein said tube member further includes a check valve adapted to prevent back flow of water from said tube member when removed from said coupler member.

15. The valve assembly of claim 14 wherein said check valve is opened by flow of fluid from said coupler member into said tube member.

16. The valve assembly of claim 9 further comprising at least one O-ring installable on said coupler member near said proximal end whereby said O-ring sealably engages said valve housing.

17. The valve assembly of claim 9 further comprising at least one O-ring installable on said supply connector member near said threaded end whereby said O-ring sealably engages said valve housing.

18. A valve assembly comprising:

a. a valve housing comprising a generally cylindrical tube having a first and second end and a longitudinal valve housing channel therethrough, said first end removably connectable to an external water source;

b. a coupler member comprising a generally cylindrical tube portion having a proximal end and a distal end and a longitudinal coupler member channel therethrough, and at least one nib protruding into said coupler member channel, wherein said proximal end is removably connectable to said second end of said valve housing whereby said valve housing channel is generally aligned with said coupler member channel and, said distal end further comprises a flange portion connected thereto;

c. said coupler member further comprising at least one O-ring installable on said coupler member near said proximal end whereby said O-ring sealably engages said valve housing;

d. a spring retainably insertable into said valve housing channel;

e. a valve insertable into said valve housing channel above said spring, said valve having a first portion that is transversely larger than said coupler member channel cross-section and a second portion that is insertable into said coupler member channel, whereby when said coupler member is connected to said valve housing, said valve is releasably biased toward said coupler member channel by said spring and said first portion of said valve blocks said coupler member channel;

f. said valve comprising an O-ring installable on said valve near said first portion whereby said valve will sealably block said coupler member channel so that no fluid may flow from said external water source through said valve housing channel;

g. a supply connector member comprising a generally cylindrical tube having a connection end, a threaded end, and at least one O-ring said connection end removably connectable to an external water source, said threaded end removably connectable to said first end of said valve housing, and said at least one O-ring installable on said supply connector member near said threaded end whereby said O-ring sealably engages said valve housing;

h. a tube member comprising a generally cylindrical tube portion having an insertion end and a non-insertion end and a longitudinal channel therethrough, wherein said insertion end is removably insertable into said coupler member channel at said coupler member distal end, said tube member further comprising at least one groove on the outer surface of said tube member, said at least one groove starting at said insertion end of said tube member and following a generally helical path around the outer surface of said tube member, said at least one groove having a locking detent portion at the end of said groove opposite said insertion end of said tube member; and i. said tube member further comprising at least one O-ring installable on said tube member at an axial location whereby said O-ring sealably engages said coupler member channel before said tube member contacts said valve; whereby said tube member contacts said second portion of said valve and at least one groove engages said at least one nib when said tube member is inserted into said coupler member and rotated said tube member is pulled into said coupler member until said locking detent portion locks said tube member in place, thereby, sufficient insertion force is applied to move said valve, and said coupler member channel is unblocked allowing fluid to flow freely from said external water source.

19. The valve assembly of claim 18 further comprising a cover plate pivotally attachable to said flange portion of said coupler member whereby said plate can be positioned to cover said coupler member channel when said tube member is not inserted, and positioned out of the way when said tube member is inserted into said coupler member channel.

20. The valve assembly of claim 18 wherein said first end of said valve housing further comprises an hexagonal portion.

21. The valve assembly of claim 18 wherein said tube member further includes a check valve adapted to prevent back flow of water from said tube member when removed from said coupler member, wherein said check valve is opened by flow of fluid from said coupler member into said tube member.

22. A device to control the flow of water comprising:

a. a valve housing comprising a generally cylindrical tube having a first and second end and a longitudinal valve housing channel therethrough, said first end removably connected to a pressurized external water source;

b. a coupler member comprising a generally cylindrical tube portion having a proximal end, a distal end, a longitudinal coupler member channel therethrough, and at least one nib protruding into said coupler member channel, said distal end further comprising a flange portion connected thereto and said proximal end is removably connected to said second end of said valve housing such that said valve housing channel is generally aligned with said coupler member channel;

c. said coupler member further comprising at least one O-ring installed on said coupler member near said proximal end whereby said O-ring sealably engages said valve housing;

d. a spring retainably inserted into said valve housing channel;

e. a valve inserted into said valve housing channel above said spring, said valve comprising a first portion that is transversely larger than said coupler member channel cross-section and a second portion that is inserted into said coupler member channel, said second portion having an open at the end opposite said first portion, a longitudinal channel communicating into said second portion, and at least one rectangular hole communicating from the outside surface of said second portion to said longitudinal channel, said valve is releasably biased toward said coupler member channel by said spring and said first portion of said valve blocks said coupler member channel;

f. said valve further comprising an O-ring installed on said valve near said first portion whereby said valve sealably blocks said coupler member channel so that no fluid will flow from said external water source through said valve housing channel until sufficient force is applied to said first portion of said valve to bias said valve away from said coupler member; and g. means for applying sufficient force to said first portion of said valve to bias said valve away from said coupler member, thereby allowing water to flow through said valve.

23. The device of claim 22 wherein said means for applying sufficient force to said first portion of said valve to bias said valve away from said coupler member is a tube member a. said tube member comprising a generally cylindrical tube portion having an insertion end, a non-insertion end, and a longitudinal channel therethrough, wherein said insertion end is removably inserted into said coupler member channel at said coupler member distal end;

b. said tube member further comprising at least one groove on the outer surface of said tube member, said at least one groove starting at said insertion end of said tube member and following a generally helical path around the outer surface of said tube member, said at least one groove having a locking detent portion at the end of said groove opposite said insertion end of said tube member; and c. said tube member further comprising at least one O-ring installed on said tube member at an axial location whereby said O-ring sealably engages said coupler member channel before said tube member contacts said valve;

d. whereby said tube member contacts said second portion of said valve and at least one groove engages said at least one nib when said tube member is inserted into said coupler member and rotated said tube member is pulled into said coupler member until said locking detent portion locks said tube member in place, thereby, sufficient insertion force is applied to said first portion of said valve to bias said valve away from said coupler member; and said coupler member channel is unblocked allowing fluid to flow freely from said external water source.

24. The device of claim 23 wherein said tube member further includes a check valve adapted to prevent back flow of water from said tube member when removed from said coupler member, wherein said check valve is opened by flow of fluid from said coupler member into said tube member.

25. The device of claim 22 wherein said first end of said valve housing further comprises an hexagonal portion.

26. The device of claim 22 further comprising a cover plate pivotally attachable to said flange portion of said coupler member whereby said plate can be positioned to cover said coupler member channel when said means for applying sufficient force to said first portion of said valve to bias said valve away from said coupler member is not in use, and positioned out of the way when said means for applying sufficient force to said first portion of said valve to bias said valve away from said coupler member is in use.

27. The device of claim 22 wherein said valve housing is removably connected to said pressurized external water source via a supply connector member, said supply connector member comprising a generally cylindrical tube having a connection end, a threaded end, and at least one O-ring said connection end removably connected to an external water source, said threaded end removably connected to said first end of said valve housing, and said at least one O-ring installed on said supply connector member near said threaded end whereby said O-ring sealably engages said valve housing.

* * * * *